(12) United States Patent
Miyazaki

(10) Patent No.: US 8,206,847 B2
(45) Date of Patent: *Jun. 26, 2012

(54) BATTERY PACK HAVING INTERCELL CONNECTOR AND MANUFACTURING METHOD THEREOF

(75) Inventor: Yutaka Miyazaki, Miki (JP)

(73) Assignee: Sanyo Electric Co., Ltd., Osaka (JP)

( * ) Notice: Subject to any disclaimer, the term of this patent is extended or adjusted under 35 U.S.C. 154(b) by 1307 days.

This patent is subject to a terminal disclaimer.

(21) Appl. No.: 11/905,062

(22) Filed: Sep. 27, 2007

(65) Prior Publication Data

US 2008/0081252 A1 Apr. 3, 2008

(30) Foreign Application Priority Data

Sep. 30, 2006 (JP) .................. 2006-270192

(51) Int. Cl.
*H01M 2/22* (2006.01)
*H01M 6/42* (2006.01)
(52) U.S. Cl. ...................... 429/158; 429/160
(58) Field of Classification Search ........... 429/156–160
See application file for complete search history.

(56) References Cited

U.S. PATENT DOCUMENTS

| | | | | |
|---|---|---|---|---|
| 3,923,549 A | * | 12/1975 | Mabuchi et al. | 429/82 |
| 6,479,187 B1 | * | 11/2002 | Takasaki et al. | 429/157 |
| 6,599,660 B2 | * | 7/2003 | Oda et al. | 429/158 |
| 7,160,643 B2 | * | 1/2007 | Kunimoto et al. | 429/97 |
| 7,960,052 B2 | * | 6/2011 | Miyazaki et al. | 429/158 |

FOREIGN PATENT DOCUMENTS

| JP | 10-106533 | 4/1998 |
|---|---|---|
| JP | 2001-345088 | 12/2001 |

\* cited by examiner

*Primary Examiner* — Tracy Dove
(74) *Attorney, Agent, or Firm* — Wenderoth, Lind & Ponack LLP

(57) ABSTRACT

A battery pack couples first and second batteries mutually linearly via a connector of a metallic plate. The connector formed of a tube with a bottom is composed of a bottom portion and a side wall. Regarding the bottom portion, an outer periphery is welded to a bottom wall of a second battery casing, while an inner periphery inwardly of the outer periphery is welded to a sealing plate of the first battery. The side wall of the connector, protruded toward the first battery, has an inner diameter larger than an outer diameter at an end portion of the first battery. Regarding the battery pack, the end portion of the first battery is inserted inside the side wall of the connector in a non-contact state, and the bottom portion is welded to the first and second batteries, thus the first and second batteries being mutually coupled by the connector.

16 Claims, 11 Drawing Sheets

PRIOR ART

BATTERY PACK HAVING INTERCELL CONNECTOR AND MANUFACTURING METHOD THEREOF

BACKGROUND OF THE INVENTION

1. Field of the Invention

The present invention relates to a battery pack and a manufacturing method in which a connector is welded to linearly couple a plurality of batteries.

2. Description of the Related Art

A battery pack with secondary batteries being linearly coupled to one another is used mainly for an electric motor vehicle such as a hybrid vehicle. In the battery pack thus structured, it is important to securely couple the secondary batteries in a manner of a low electric resistance without causing a harmful effect to the batteries. There has been developed a configuration in which a connector made of a metallic plate is welded to linearly couple secondary batteries to make up a battery pack. Refer to Japanese Laid-Open Patent Publication Nos. H10-106533 (1998) and 2001-345088.

A battery pack and its connector 90 disclosed in Japanese Laid-Open Patent Publication H10-106533 (1998) are shown in FIGS. 1 and 2. The connector 90, as shown in FIG. 2, is so structured as to have a metallic plate press-formed into a shape where a tubular side wall 94 is extended along an outer circumference of a bottom face 93. In the connector 90 as shown in FIGS. 3 and 4, the bottom face 93 is spot-welded to a sealing plate 12 on a first battery 10A, and then the tubular side wall 94 is pressed by a welding electrode 40 against a battery casing 11 of a second battery 10B, so that the tubular side wall 94 is spot-welded for coupling to the outer surface of the battery casing 11.

A connector disclosed in Japanese Laid-Open Patent Publication 2001-345088 has several welding projections 81 protruded from both faces of the connector, as shown in FIG. 5. As shown in FIG. 6, for battery connection, the welding projections 81 from both the faces are spot-welded to opposing battery ends of linearly placed batteries 10. A connector 80 used here is attached between the two adjoining batteries 10, and then welded to the end surfaces of the upper and lower batteries by allowing a welding current to flow via the first battery 10A and the second battery 10B, as shown in FIG. 7.

SUMMARY OF THE INVENTION

In the case of the above-mentioned battery pack, a large amount of welding current used for welding the connector may happen to over-heat the battery, and such an excessive heat is prone to cause a harmful effect to the battery. In the case of the connector 90 shown in FIG. 4, when the tubular side wall 94 is spot-welded to the bottom wall of the battery casing 11, a pair of welding electrodes 40 are pressed against opposing positions on the battery casing 11. In this state, when a large current is flown from the welding electrode 40, the battery casing 11 is heated by means of Joule's heat. Such heated battery casing 11 causes a harmful effect by heat to a separator interposed between the electrodes and others which are contained in the battery casing 11. Further, as shown in FIG. 7, in the case of a battery pack where the welding electrode 40 is pressed against the battery casings 11 of the upper and lower batteries 10 to weld the top and bottom faces of the connector 80 to the end surfaces of the batteries 10, a large amount of welding current flows from the battery casings 11 of the upper and lower batteries 10 through the connector 80, as indicated by a thick line. Especially, in the case of the first battery 10A, although not shown, the first battery 10A is prone to be damaged because a large amount of welding current is flown through an electrode group (a positive plate, a separator, and a negative plate) as a component inside the battery.

The present invention has been made in order to overcome the above-mentioned drawbacks. It is the primary object of the invention to provide a battery pack and manufacturing method in which while a connector is of a simplified structure, the battery is less likely to be thermally influenced when the connector is welded to the battery, so that a heat deterioration of the battery is able to be effectively avoided.

In the inventive battery pack, the first battery 10A, with the aperture of the battery casing 11 being closed by the sealing plate, is placed in a linear relationship with the second battery 10B, and both the batteries are coupled together through the connector 20, of a metallic plate, which is disposed between the first battery 10A and the second battery 10B. The connector 20 is welded to the sealing plate 12 of the first battery 10A and to the battery casing 11 of the second battery 10B, so that the adjoining first battery 10A and second battery 10B are linearly disposed to be connected in series. Further, the connector 20, being of a metallic plate, is in a form of a tube with a bottom, being composed of a bottom portion 21 and a side wall 22. In regard to the bottom portion 21, an outer periphery 21A is welded to the bottom wall of the battery casing 11 of the second battery 10B, while an inner periphery 21B at the interior side the outer periphery 21A is welded to the sealing plate 12 of the first battery 10A. Further, the side wall 22 of the connector 20, being protruded toward the first battery 10A, has an inner diameter larger than an outer diameter at the end portion of the first battery 10A, so that the first battery 10A is inserted inside the side wall 22 in a non-contact state. Moreover, the end portion of the first battery 10A is inserted inside the side wall 22 of the connector 20 in a non-contact state, with the bottom portion 21 being welded to the first battery 10A and the second battery 10B, so that the first battery 10A is coupled to the second battery 10B by means of the connector 20.

In the present battery pack, it is possible that the battery 10 has the sealing plate 12 fixed to an aperture of the battery casing 11 by mechanically caulking a periphery of the aperture, that the connector 20 is provided with a recess at the bottom portion 21 as the inner periphery 21B, that such recessed inner periphery 21B is welded to the sealing plate 12 of the first battery 10A, and that the outer periphery 21A is welded to the bottom wall of the battery casing 11 of the second battery 10B.

In the above-described battery pack, the battery, in which the sealing plate is fixed to the aperture by mechanically caulking the periphery of the aperture of the battery casing, is coupled by means of the connector. Further, the connector is provided, at its bottom portion, with the recess as the inner periphery, such recessed inner periphery is welded to the sealing plate of the first battery, and the outer periphery is welded to the bottom wall of the battery casing of the second battery. This battery pack is able to be coupled to the sealing plate of the first battery, without making any contact with a caulked ridge of the first battery.

In the present battery pack, it is possible to dispose an insulation ring 30, 50 between the outer periphery 21A and side wall 22 of the connector 20 and the first battery 10A, so that this insulation ring 30, 50 may insulate the connector 20 from the battery casing 11 of the first battery 10A. The insulation ring 50 may be provided, at its outer periphery, with a fitting-in groove 54 for allowing the lip of the side wall 22 to be fitted in.

In the above-described battery pack, the insulation ring is disposed between the outer periphery and side wall of the connector and the first battery, so that the connector is insulated from the battery casing of the first battery by means of the insulation ring. Such battery pack carries the advantage that the connector can be unfailingly insulated from the battery casing of the first battery.

Further, the battery pack carries the advantage that the insulation ring is provided, at its outer periphery, with the fitting-in groove for allowing the lip of the side wall to be fitted in, so that the outside of the side wall of the connector is unfailingly insulated by means of the insulation ring.

In the present battery pack, it is possible that the connector 20 is provided, at its inner periphery 21B of the bottom portion 21, with the welding projection 23 which protrudes toward the sealing plate 12 of the first battery 10A, and that the outer periphery 21A is provided with the welding projection 23 protruding toward the bottom wall of the second battery 10B.

In the above-described battery pack, the inner periphery of the bottom portion of the connector is provided with the welding projection protruding toward the sealing plate of the first battery, and the outer periphery is provided with the welding projection protruding toward the bottom wall of the battery casing of the second battery. Such battery pack carries the advantage that the connector can be unfailingly spot-welded to the sealing plate of the first battery and to the bottom wall of the battery casing of the second battery.

Further, in the method for manufacturing the inventive battery pack, the first battery 10A, with the aperture of the battery casing 11 being closed with the sealing plate, is placed in a linear relationship with the second battery 10B; the connector 20 made of a metallic plate is disposed between the first battery 10A and the second battery 10B; the connector 20 is welded to the sealing plate 12 of the first battery 10A and to the battery casing 11 of the second battery 10B; and the adjoining first battery 10A and second battery 10B are linearly placed to be connected in series. In the manufacturing method, the metallic plate is in a form of a tube with a bottom, being composed of the bottom portion 21 and the side wall 22; the bottom portion 21 is provided with the inner periphery 21B welded to the sealing plate 12 of the first battery 10A and also with the outer periphery 21A welded to the bottom wall of the battery casing of the second battery 10B; and further the side wall 22 is formed in a shape which allows the end portion of the first battery 10A to be inserted inside the side wall 22 of the connector 20 in a non-contact state, to thus make up the connector 20. The end portion of the first battery 10A is inserted inside the side wall of the connector 20 in a non-contact state; the inner periphery 21B provided at the bottom portion 21 of the connector 20 is fixedly welded to the sealing plate of the first battery 10A; the second battery 10B is subsequently stacked on the connector 20 so that the connector 20 is interposed between the first battery 10A and the second battery 10B; the welding electrode 40 is pressed against the wall of the battery casing 11 of the second battery 10B and against the side wall 22 of the connector 22; and the outer periphery 21A provided at the bottom portion 21 of the connector 20 is welded to the bottom wall of the battery casing 11 of the second battery 10B.

The above-described battery pack and manufacturing method for the battery pack carries the advantage that, with the connector being of a simplified structure, the flow of the electric current when welding the connector to the battery is able to be controlled so as to unfailingly avoid the deterioration of the battery caused by the welding heat. Such excellent feature is realized by forming the wide wall provided to the connector into a shape that allows the first battery to be inserted in a non-contact state. In regard to the connector, for example as shown in FIG. 14, the welding electrode 40 is pressed to weld the connector 20 to the bottom wall of the battery casing 11 of the second battery 10B. The thick line indicated in this Figure shows the flowing path of the welding current. As indicated at the thick line, the welding current flows from the outer circumferential wall of the second battery, through the bottom wall of the battery casing, to the outer periphery 21A of the connector 20, and then to the side wall 22 of the connector 20, so that the outer periphery of the connector 20 is spot-welded to the bottom wall of the battery casing. The welding current flowing through this path, without flowing through the battery casing of the first battery and through the sealing plate, does not heat the first battery by means of Joule's heat. Further, in the case of the second battery, because the welding current flows from the surface of the battery casing, through the bottom wall, and to the outer periphery of the connector, the current path of flowing through the battery casing is extremely short, so that the battery casing is less heated by means of Joule's heat, so that the heat damage of the second battery by the welding current can be reduced to minimum.

On the other hand, in the case of a conventional type of battery pack, the connector is welded by allowing the welding current to flow as indicated by a thick line in FIGS. 4 and 7, so that the first and second batteries are subjected to a heat damage. In the case of the battery pack shown in FIG. 4, when the side wall 94 of the connector 90 is welded to the battery casing 11 of the second battery 10B, a large amount of welding current flows through a long path at the bottom wall of the second battery 10B, which causes a heat damage to the second battery 10B. In the case of the battery pack shown in FIG. 7 as well, a large amount of welding current flows through a long path from the battery casing 11 of the second battery 10B, through the connector 80, to the sealing plate of the first battery 10A, to the electrode zone (from the positive plate through the separator to the negative plate) in the first battery 10A, and then to the battery casing 11 of the first battery 10A. For this reason, a large amount of current flowing through the inside of the first battery 10A causes a heat damage to the first battery 10A.

Further, the inventive battery pack and the manufacturing method of the battery pack as described above carries the advantage that the connector can be unfailingly welded to the first battery and the second battery. This is because the connector, being in a form of a tube with a bottom, being composed of the bottom portion and the side wall, allows the end portion of the first battery to be inserted inside the side wall in a non-contact state, and fixedly welds the inner periphery, being provided at the bottom portion of the connector, to the sealing plate of the first battery; the first battery and the second battery are stacked so as to interpose the connector; the welding electrode is pressed against the battery casing for the second battery and against the wide wall of the connector; and the outer periphery provided at the bottom portion of the connector is welded to the bottom wall of the battery casing of the second battery. In particular, when the outer periphery of the connector is welded to the second battery, a pair of welding electrodes are laterally pressed, for welding, against the battery casing of the second battery and against the wide wall of the connector fixed to the first battery. Thus, the configuration that the welding electrode is pressed against the side wall of the connector is able to enlarge the size of the pressed area, so that the welding electrode can be unfailingly pressed while a conventional type of welding electrode is used. Further, since the welding electrode is laterally pressed against the side wall having the end portion of the first battery inserted inside allows for a stable press of the welding electrode for the unfailing welding arrangement.

The above and further objects of the present invention as well as the features thereof will become more apparent from the following detailed description to be made in conjunction with the accompanying drawings.

DETAILED DESCRIPTION OF THE PREFERRED EMBODIMENT(S)

Figure 1:
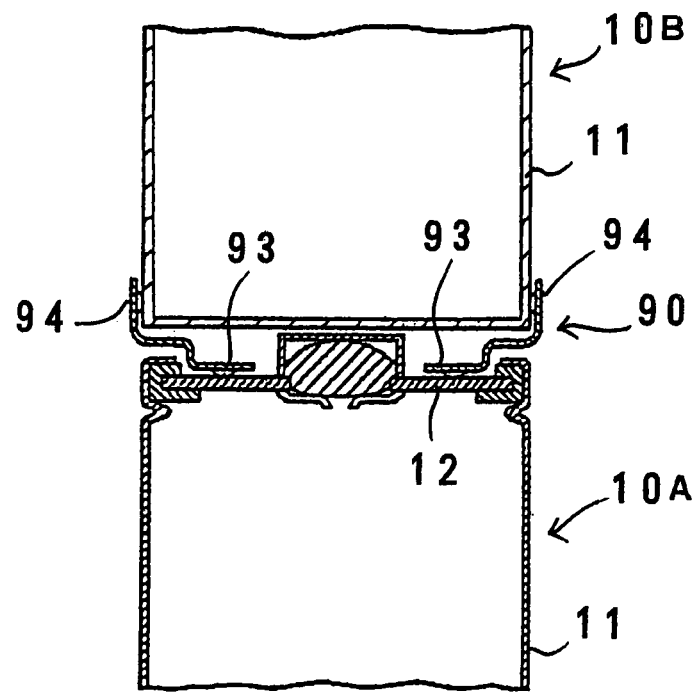
FIG. 1 is an elevated cross-sectional view of a coupling configuration in a conventional type of battery pack.
Figure 2:
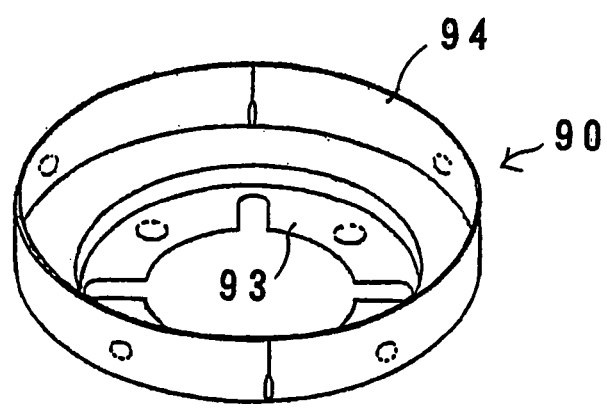
FIG. 2 is a perspective view of a connector used in the battery pack shown in FIG. 1.
Figure 3:
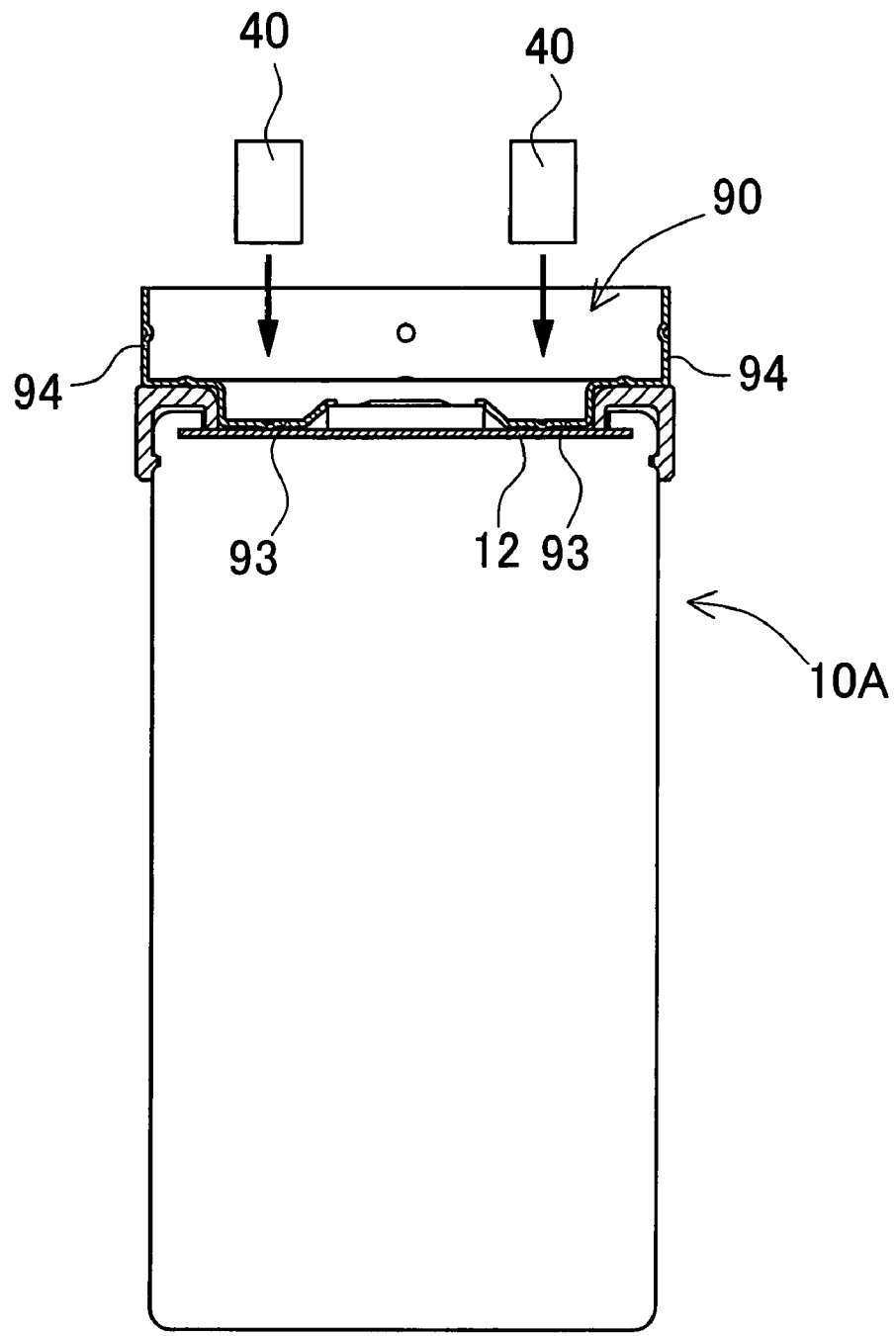
FIG. 3 is a schematic cross-sectional view showing a coupling process in the battery pack shown in FIG. 1.
Figure 4:
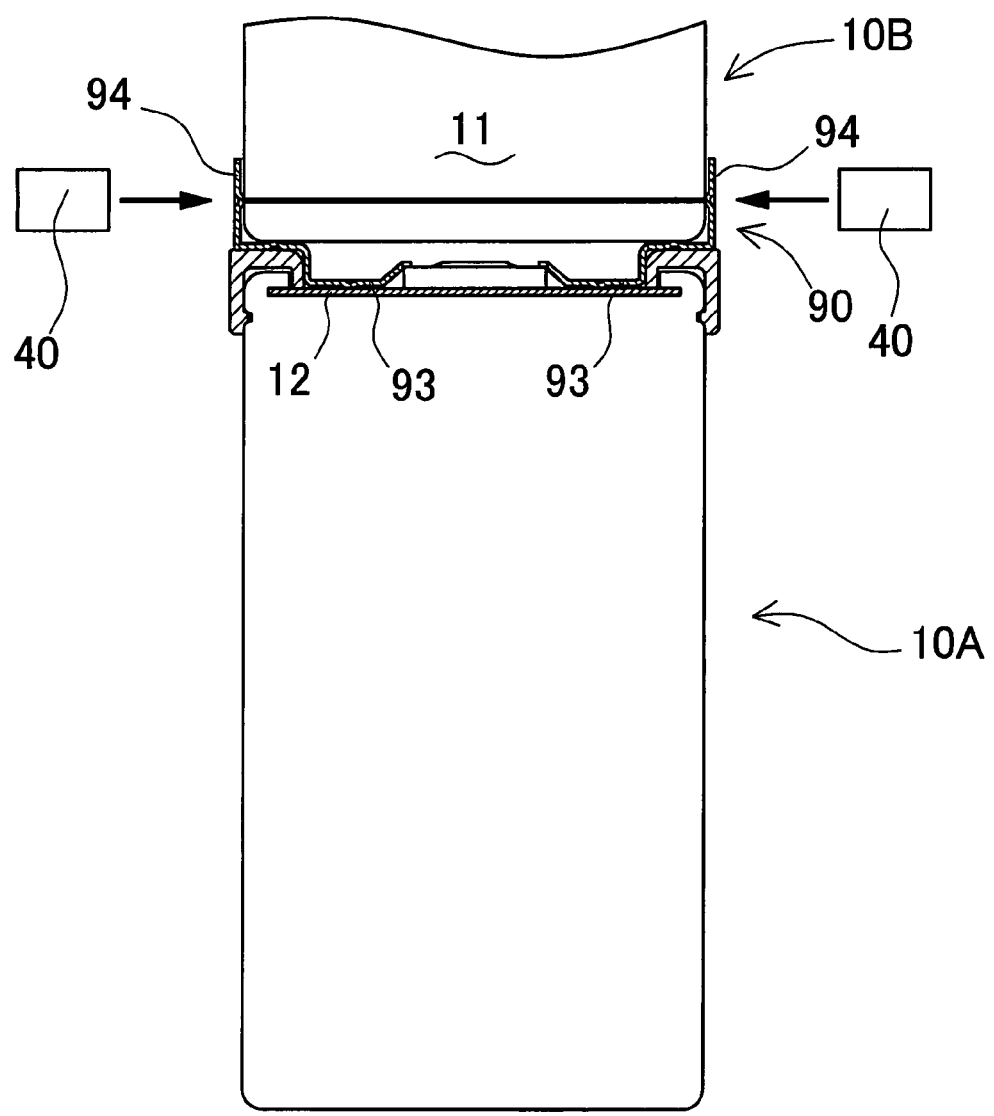
FIG. 4 is a schematic cross-sectional view showing a coupling process in the battery pack shown in FIG. 1.
Figure 5:
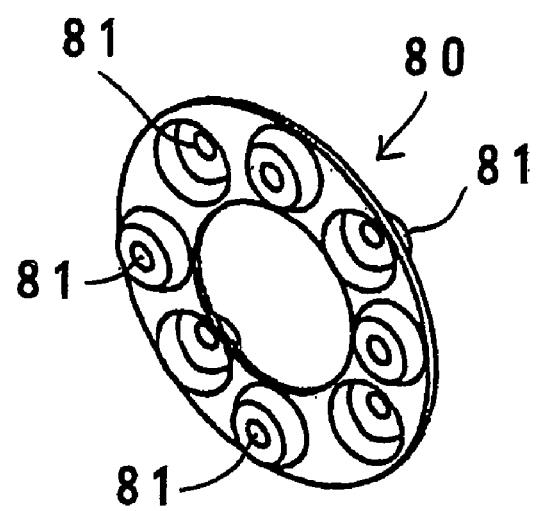
FIG. 5 is a perspective view of a connector in an alternative, conventional configuration.
Figure 6:
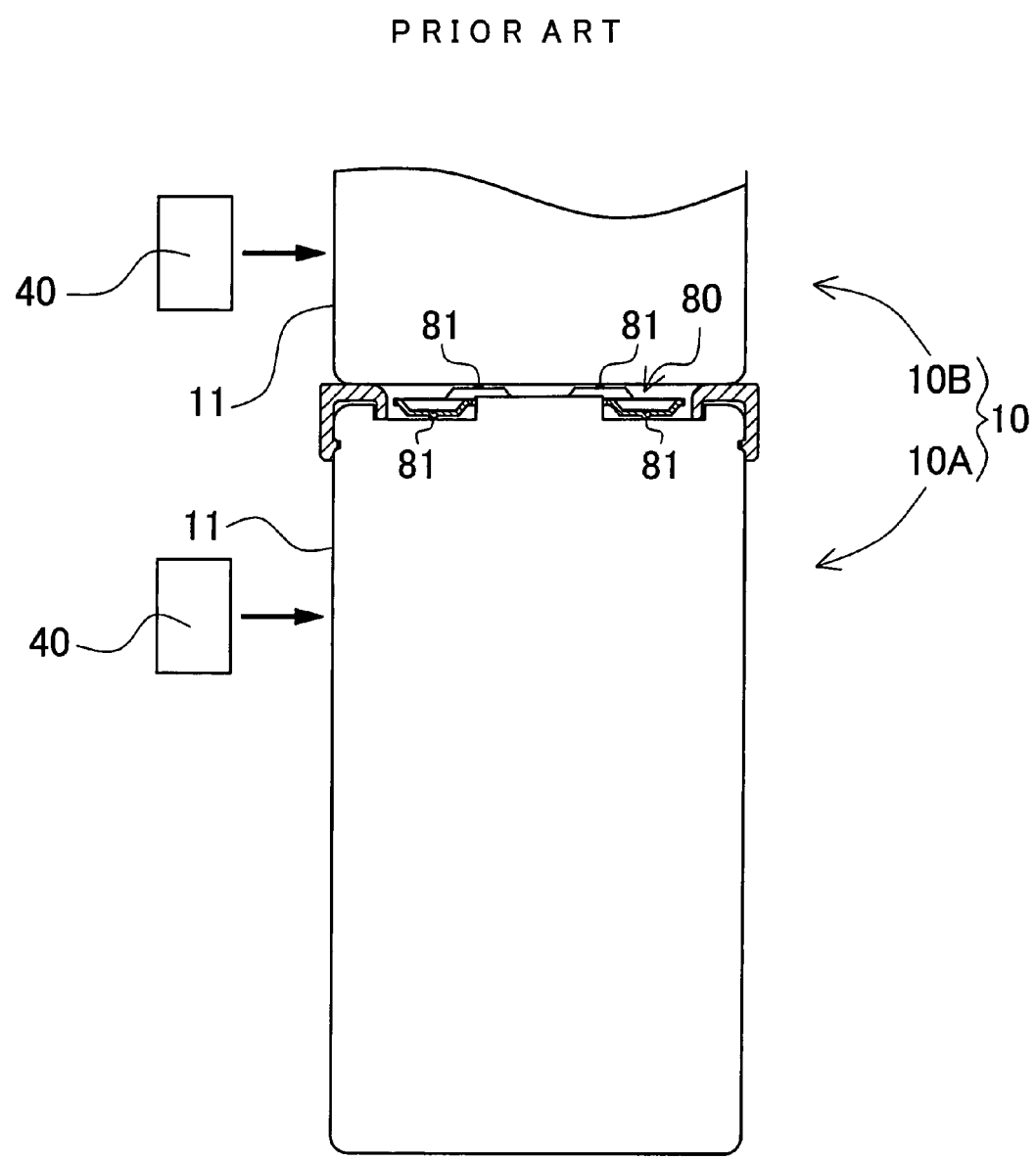
FIG. 6 is a schematic cross-sectional view showing a coupling configuration in the battery pack using the connector shown in FIG. 5.
Figure 7:
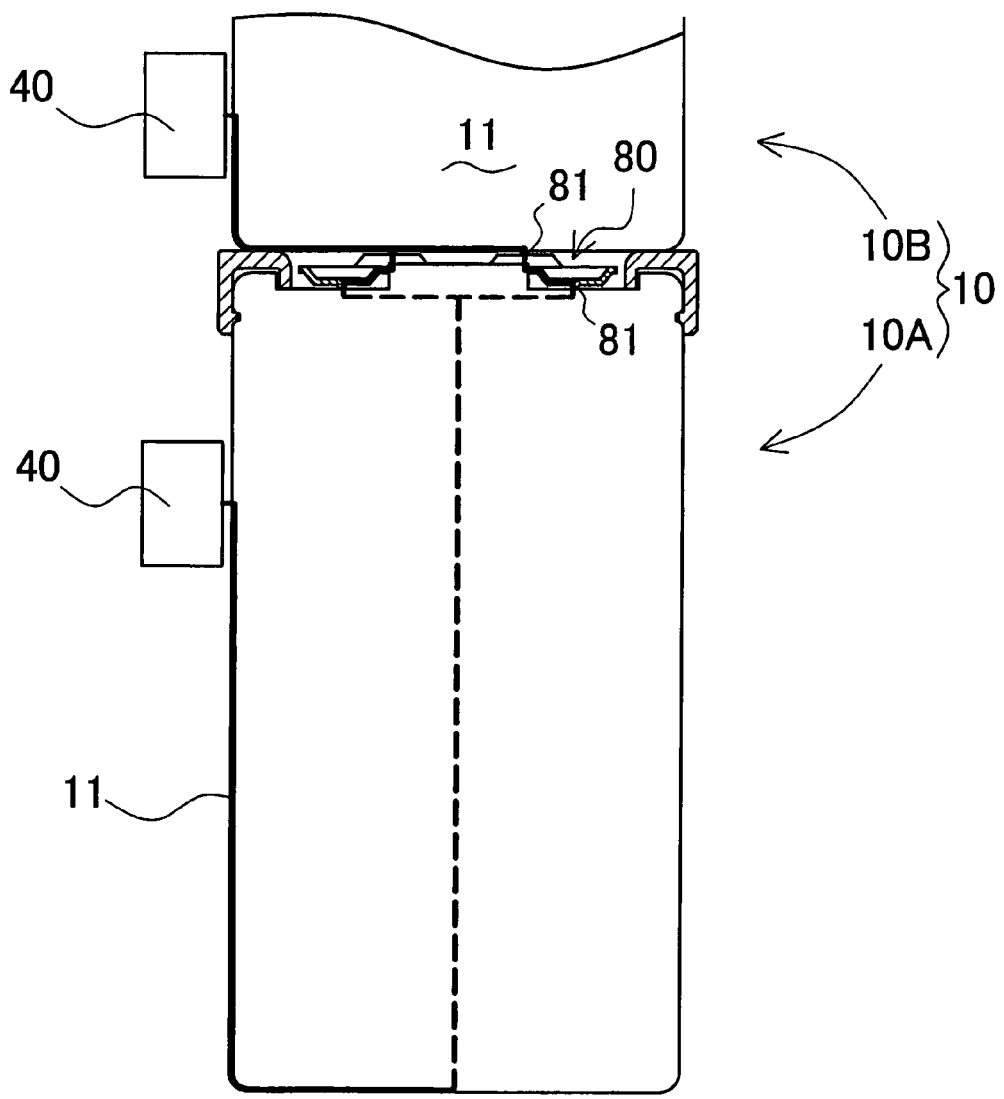
FIG. 7 is a schematic cross-sectional view showing how batteries are coupled in the battery pack shown in FIG. 6.
Figure 8:
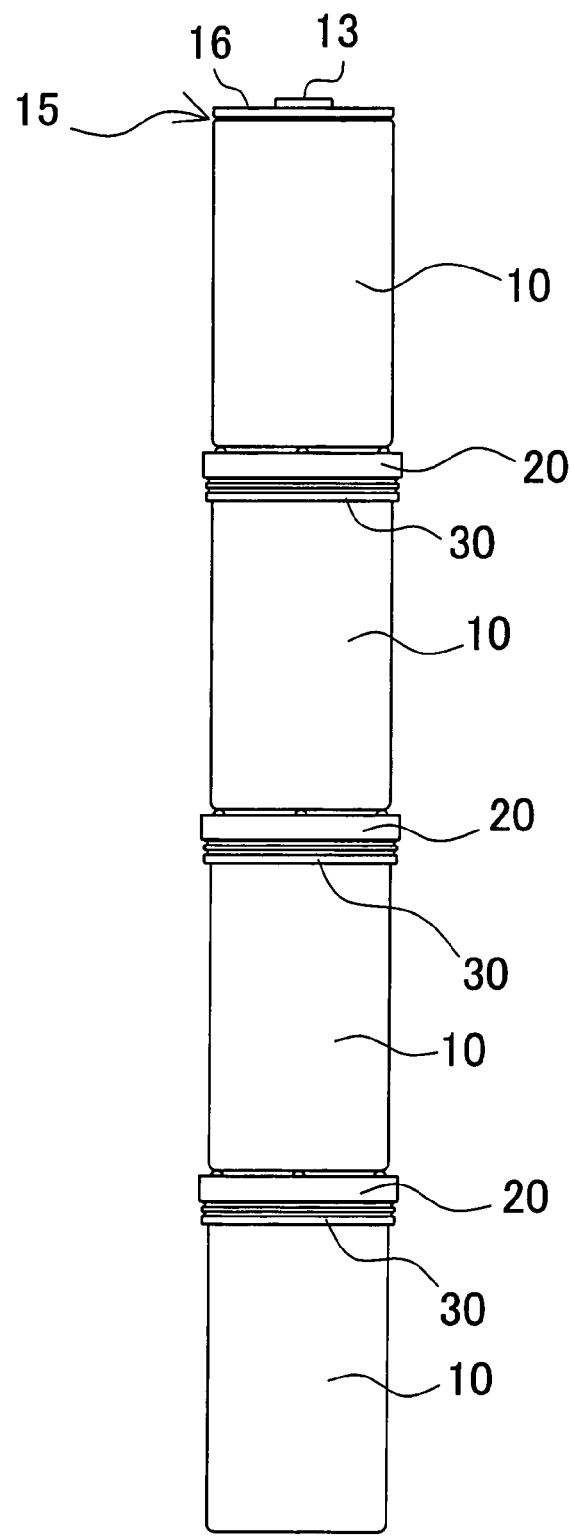
FIG. 8 is a side view of the battery pack in accordance with an embodiment of the present invention.

In the battery pack shown in FIG. 8, a plurality of rechargeable batteries 10 are connected in series and linearly coupled to each other. In the case of the battery pack thus structured, the plurality of batteries 10 are connected in series and are used mainly with an electric motor vehicle such as a hybrid vehicle. It should be noted that that the inventive battery pack is also able to be used for such an application as may require a high power like in other than an electric motor vehicle. The illustrated battery pack is connected in series by linearly coupling the rechargeable batteries 10 which are tubular batteries. The battery pack is also able to be made up with polygonal secondary batteries being linearly coupled for connection in series.

A rechargeable battery to be used for a battery pack includes any rechargeable type of batteries including a nickel-hydrogen battery, a lithium-iron secondary battery, and a nickel-cadmium battery. Here, a nickel-hydrogen battery is most suitable as a battery to be used for a battery pack to be mounted for an electric motor vehicle. This is because such battery has a higher output power with respect to a volume and a weight, being excellent in large current characteristics.

Figure 10:
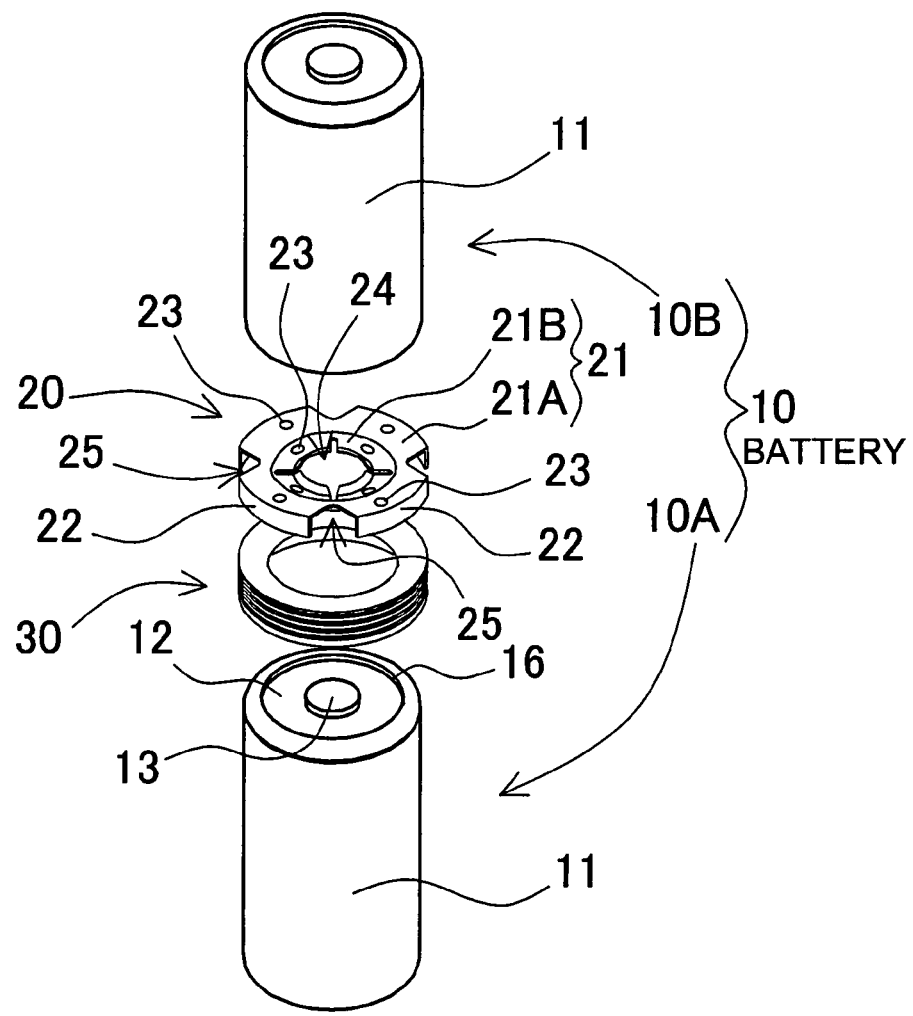
FIG. 10 is an exploded perspective view showing the coupling configuration in the battery pack shown in FIG. 8.

The battery 10, as shown in the enlarged cross-sectional view in FIG. 10, has the aperture of the battery casing 11 airtightly sealed by the sealing plate 12. The battery casing 11 and the sealing plate 12 are of a metallic plate. The battery casing 11 is made by press-forming the metallic plate into a tube having an integrated bottom wall. The sealing plate 12 is provided, at its center, with a protruded electrode 13. Inside the battery casing 11 is incorporated an electrode (not shown). A battery electrolyte is also filled in the battery casing 11. The battery casing 11 has the sealing plate 12 fixed airtightly by mechanically caulking the edge of the aperture. The sealing plate 12 is fixed airtightly by being interposed by a caulking portion of the battery casing 11 via a gasket 14. The gasket 14 is of an insulating rubber-like elastic material, which serves to insulate the sealing plate 12 from the battery casing 11 as well as to airtightly seal a gap between the sealing plate 12 and the battery casing 11. In order to mechanically caulk and interpose the sealing plate 12, the battery 10 thus structured is provided with a groove 15 running along the circumstance at the edge where the sealing plate 12 is provided. Further, the sealing plate 12 is provided, at its periphery, with a caulking ridge 16.

In regard to the battery 10, the sealing plate 12 serves as a first electrode, while the battery casing 11 serves as a second electrode. In the case of a nickel-hydrogen battery, the first electrode acts as a positive electrode, while the second electrode acts as a negative electrode. The battery is also able to be so arranged as to have a negative, first electrode and a positive, second electrode.

In the battery pack shown in FIG. 8, a plurality of batteries 10 are linearly coupled and connected in series. The battery pack has, between the linearly coupled batteries 10, the connector 20 disposed for electrically connecting the batteries 10 and also has the insulation ring 30 disposed for insulating the connector 20 from the batteries 10. In the battery pack, the connector 20 is used to connect the sealing plate 12 of the first battery 10A and the battery casing 11 of the second battery 10B. The first battery 10A welds and connects the sealing plate 12 to the connector 20, while the second battery 10B connects the battery casing 11 to the connector 20. The connector 20 which is connected to the battery casing 11 of the second battery 10B has a potential difference with respect to the battery casing 11 of the first battery 10A, so that the connector 20 is insulated from the battery casing 11 of the first battery 10A. Therefore, the insulation ring 30 is provided between the connector 20 and the battery casing 11 of the first battery 10A, so that the insulation ring 30 may serve to insulate the connector 20 from the battery casing 11 of the first battery 10A.

The connector 20 is made by press-forming the metallic plate. The connector 20 is provided with a metal plating layer on both faces of an underlaying metal such as an iron sheet. The metal plating layer is composed of a conductive plating layer, with an excellent conductivity and a lower electrical resistance, and a resistive plating layer, which is suitable for welding, in lamination with the surface of the conductive plating layer. The conductive plating layer is of copper, silver, or an alloy of these metals, so that the plating layer has a lower electrical resistance than those of the underlaying metal and the resistive plating layer. The resistive plating layer is of nickel, chrome, or an alloy of these metals, so that the plating layer has a higher electrical resistance than that of the conductive plating layer. The connector 20 is easier to be thermally generated by the conductive plating layer, and is quickly welded to the end portion of the battery. Further, since the conductive plating layer has a lower electrical resistance, the batteries 10 can be connected in series in a state of a low electric resistance.

Figure 11:
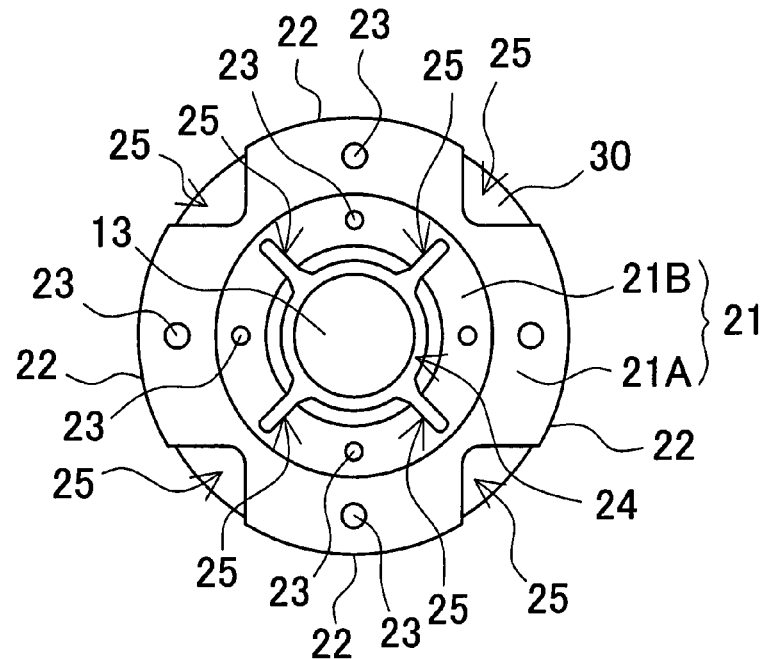
FIG. 11 is a top plan view showing the connector in the battery pack shown in FIG. 9.

The connector 20 is welded and connected to the battery end faces of the adjoining batteries which are oppositely disposed, and the first battery 10A and the second battery 10B are electrically connected in series. The connector 20 shown in FIGS. 10 and 11 is made by press-forming the metallic plate into a form of a tube with a bottom, being composed of the bottom portion 21 and the side wall 22. The bottom portion 21 is so structured that the outer periphery 21A is welded to the bottom wall of the battery casing 11 of the second battery 10B and that the inner periphery 21B at the inner side the outer periphery 21B is welded to the sealing plate 12 of the first battery 10A, so that the first battery 10A and the second battery 10B are interconnected.

The bottom portion 21 is so structured that the welding projections 23 protruding toward the both faces are welded to the sealing plate 12 of the first battery 10A and to the bottom wall of the battery casing 11 of the second battery 10B, so that the adjacently disposed first battery 10A and second battery 10B are connected in series. The bottom portion 21 is provided with a central hole 24, into which is inserted the protruded electrode 13 of the first battery 10A. The bottom portion may also be configured to project a guide portion for guiding the protruded electrode of the first battery, without opening such central hole.

The bottom portion 21, being larger than the outer diameter of the battery casing 11 of the first battery 10A, has the side wall 22 coupled to the outer periphery. In order to prevent a short-circuit in contact with the mechanically caulked ridge 16 of the first battery 10A, the bottom portion 21 is provided with the insulation ring 30 with respect to the mechanically caulked ridge 16. The insulation ring 30 is made by forming an insulation material, such as a rubber-like elastic material and a plastic material, into a ring shape. The insulation ring 30 is coupled to the insulation plate 31, for insulating the bottom portion 21 of the connector 20 from the mechanically caulked ridge 16, and to the outer side of the insulation plate 31, and is integrally structured with an insulation tube 32 for covering the outer side of the battery casing 11. The insulation plate 31, along the inner periphery, is integrally structured with a ring ridge 33 for covering the inner face of the mechanically caulked ridge 16. The ring ridge 33 is so configured as to be fitted inside the mechanically caulked ridge 16. The insulation ring 30 has the ring ridge 33 disposed in a fixed position by fitting the ring ridge 33 inside the mechanically caulked ridge 16. Further, the inner periphery 21B of the connector 20 is unfailingly insulated from the mechanically caulked ridge 16.

The connector 20 has the inner periphery 21B provided with a recess at the bottom portion 21. Such recessed inner periphery 21B is welded to the sealing plate 12 of the first battery 10A, so that the outer periphery 21A is in a non-contact state being set apart from the mechanically caulked ridge 16 of the battery casing 11 of the first battery 10A. The connector 20 is made by press-forming the metallic plate into a stepped form between the inner periphery 21B and the outer periphery 21A. The inner periphery 21B is disposed in a position adjacent to the surface of the sealing plate 12 of the first battery 10A. The outer periphery 21A is disposed in a position adjacent to the bottom wall of the battery casing 11 on a top surface of the insulation ring 30.

The outer diameter of the inner periphery 21B of the connector 20 is smaller than the inner diameter of the mechanically caulked ridge 16 of the first battery 10A. The connector 20 has the ring ridge 33 of the insulation ring 30 placed between the inner periphery 21B and the mechanically caulked ridge 16, so that the bottom portion 21 can be unfailingly insulated from the mechanically caulked ridge 16. Further, a step between the outer periphery 21A and the inner periphery 21B is larger than the amount of protrusion of the mechanically caulked ridge 16. In regard to the connector 20, the inner periphery 21B is welded to the sealing plate 12 of the first battery 10A, so that the insulation plate 31 of the insulation ring 30 can be disposed between the outer periphery 21A and the mechanically caulked ridge 16. Such configuration allows the connector 20 to be unfailingly insulated from the sealing plate 12 of the first battery 10A by means of the insulation ring 30.

The connector 20, at its inner periphery 21B and outer periphery 21A, has a plurality of welding projections 23 provided for welding respectively. The welding projections 23 on the inner periphery 23 are protruded toward the sealing plate 12 of the first battery 10A and are welded to the sealing plate 12. The welding projections 23 in the outer periphery 21A are protruded toward the bottom wall of the battery casing 11 of the second battery 10B and are welded to the outer periphery 21A at the bottom wall of the battery casing 11. The welding projections 23 on both the inner periphery 21B and the outer periphery 21A are welded to the opposing batteries 10, so that the first battery 10A and the second battery 10B are connected in series.

The connector 20 shown in FIGS. 10 and 11 is provided with four pieces of welding projections on the inner periphery 21B and the outer periphery 21A, respectively. Each of these four welding projections provided on the inner periphery 21B and the outer periphery 21A respectively is disposed concentrically. The inner periphery 21B and the outer periphery 21A are provided with the welding projections 23 at equal intervals with a pitch of 90 degrees. Further, the welding projections 23 on the inner periphery 21B and the welding projections 23 on the outer periphery 21A are disposed in a mutually adjacent position. In the illustrated connector 20, the welding projections 23 on the inner periphery 21B and the welding projections 23 on the outer periphery 21A are disposed in the same radial direction so as to be the nearest possible with respect to each other. Thus, the configuration where the welding projections 23 on the inner periphery 21B and the welding projections 23 on the outer periphery 21A are disposed in proximity carries the advantage that the path length of the electric current can be the shortest possible, reducing the electric resistance generated over the length. It is still possible that the connector has three to ten pieces of welding projections on the inner periphery and on the outer periphery, respectively.

Further, the inner periphery 21B and the outer periphery 21A are respectively provided with a cutout or notching 25 between the adjacent welding projections 23. The cutout 25 on the inner periphery 21B is provided in a radial extension from the central hole 24 of the inner periphery 21B. The cutout 25 on the outer periphery 21A is provided toward the center from the outer circumference. The inner periphery 21B and the outer periphery 21A have these cutouts 25 provided at equal intervals with a pitch of 90 degrees. The cutout 25 on the inner periphery 21B and the cutout 25 on the outer periphery 21A, which are mutually in an opposite relationship, are disposed in the same radial direction so that the respective bottom portions may be in proximity. The illustrated cutout 25 is formed in a slit shape of the same width. It should be noted that the cutout does not necessarily have to be in a slit shape, which can be in a triangular or arcuate shape. Thus, the connector 20 having the cutout 25 between the adjacent welding projections 23 carries the advantage that a welding current flowing to the respective welding projection 23 can be made uniform for an unfailingly welding process.

Further, the bottom portion 21 of the connector 20 is so arranged that the inner periphery 21B and the outer periphery 21A are divided by the cutout 25 into a plurality of regions, so that a relative direction of each of the mutually adjacent regions can be changed. That is to say, the inner periphery 21B and the outer periphery 21A are so structured as to be somewhat elastically deformable at the boundary of the cutout 25. Owing to the elasticity of the divided inner periphery 21B and outer periphery 21A, the connector 20 thus structured is able to extremely reduce the damage that the welded portion receives, by diversifying the stress acting upon the connection portion of the battery pack. As such, advantageously, a strength can be increased against a vibration and bending force at the connection portion of the battery pack. The illustrated connector 20 is provided with the cutout 25 respectively on the inner periphery 21B and the outer periphery 21A, and the inner periphery 21B and the outer periphery 21A are divided into a plurality of regions. It should be noted that the connector can also be provided with the cutout on either of the inner periphery or the outer periphery and divide such either one into a plurality of regions. Further, although the illustrated connector 20 has the inner periphery 21B and the outer periphery 21A respectively divided by the cutout 25 into the four regions, the connector can also have the inner periphery or the outer periphery divided by the cutout into three to ten regions.

Figure 9:
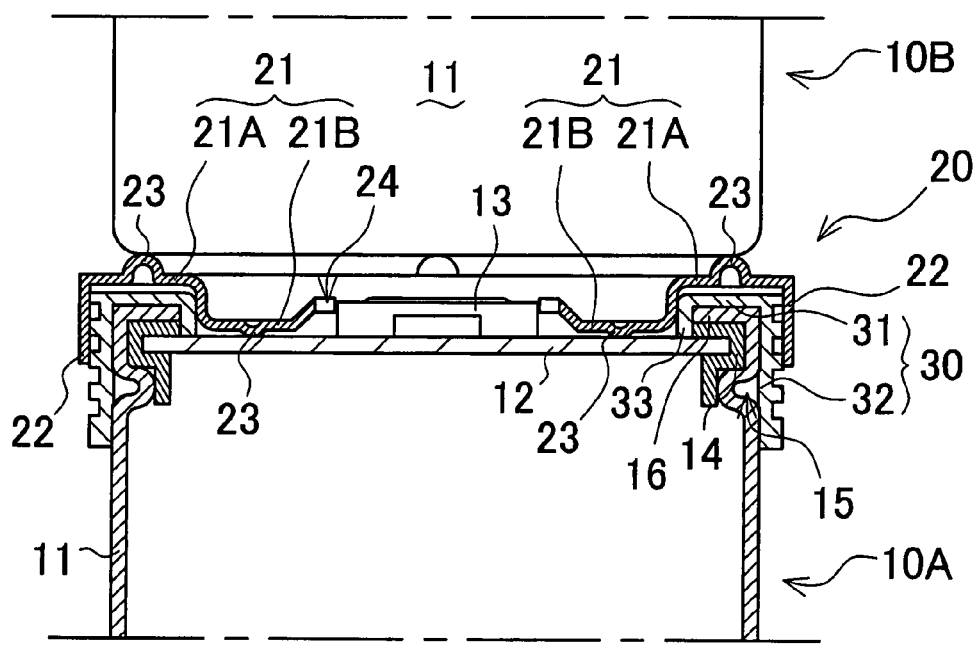
FIG. 9 is an enlarged cross-sectional view showing the coupling configuration in the battery pack shown in FIG. 8.

The side wall 22 of the connector 20 is not for inserting the battery casing 11 of the second battery 10B but is for inserting the end portion of the first battery 10A. Accordingly, the side wall 22 is provided so as to protrude toward the first battery 10A. The side wall 22, as shown in FIG. 9, has its inner diameter larger than the outer diameter of the end portion of the first battery 10A, namely, the outer diameter of the battery casing 11. In the case where polygonal batteries are combined into a battery pack, the inner contour of the side wall is made larger than the outer contour of the end portion of the first battery. This is because the battery casing 11 of the first battery 10A is inserted inside the side wall 22 in a non-contact state, so that the connector 20 is kept in a non-contact state with the battery casing 11 of the first battery 10A. Further, the battery pack shown in FIGS. 9 and 10 has the insulation wall 32 of the insulation ring 30 disposed between the side wall 22 of the connector 20 and the battery casing 11 of the first battery 10A. The side wall 22, at its inner contour, is so formed as to allow insulation tube 32 to be inserted inside.

Figure 12:
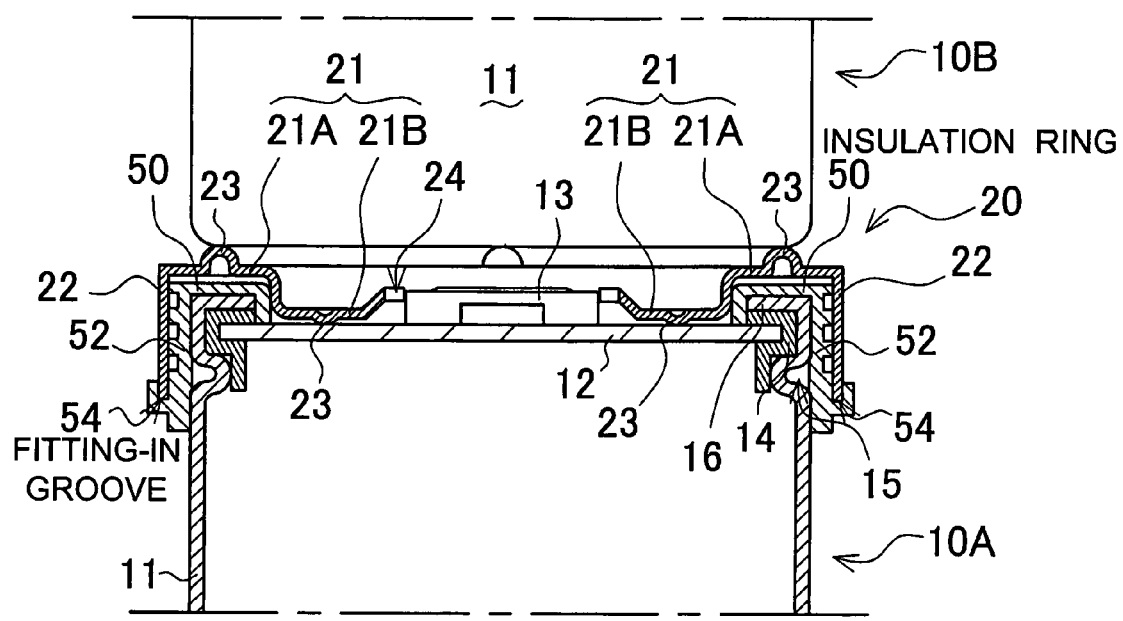
FIG. 12 is an enlarged cross-sectional view showing another exemplary connector.

Further, the insulation ring 50 shown in FIG. 12 is provided, at the outer surface of the insulation tube 52, with a fitting-in groove 54 for allowing the lip of the side wall 22 to be fitted in. The fitting-in groove 54 is formed to a depth that allows only the lip of the side wall 22, or else generally half of the side wall. When the entirety of the side wall is inserted into the fitting-in groove, the welding electrode can not be pressed against the outer surface. Therefore, the fitting-in groove 54 is so arranged in its depth as to allow the surface of the side wall 22 to be exposed to such an extent that the welding electrode may be pressed against the side wall 22. In this way, the external structure for fitting the lip of the side wall 22 inside the fitting-in groove 54 allows the outside of the side wall 22 to be unfailingly insulated by the insulation ring 50. It should be noted that the insulation ring does not necessarily have to be provided with a fitting-in portion. The insulation ring can also insulate the side wall from the battery casing by providing a ring ridge along the lip of the side wall, instead of the fitting-in groove. Further, an insulation ring without the fitting-in portion or the ridge can unfailingly insulate the side wall by making the height (depth) of the insulation tube larger than the height (depth) of the side wall of the connector.

Figure 13:
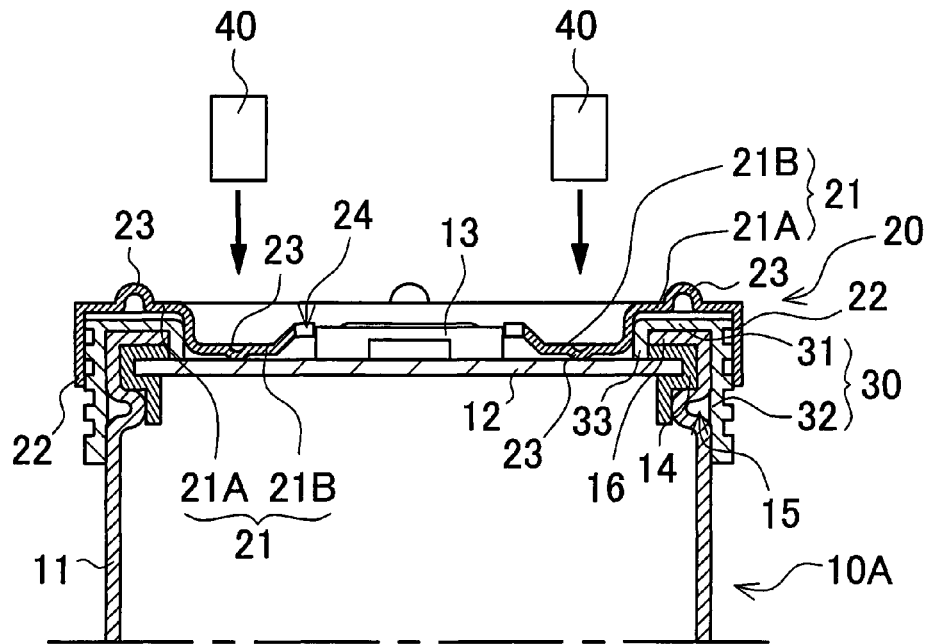
FIG. 13 is an enlarged cross-sectional view showing the coupling process in the battery pack shown in FIG. 9.
Figure 14:
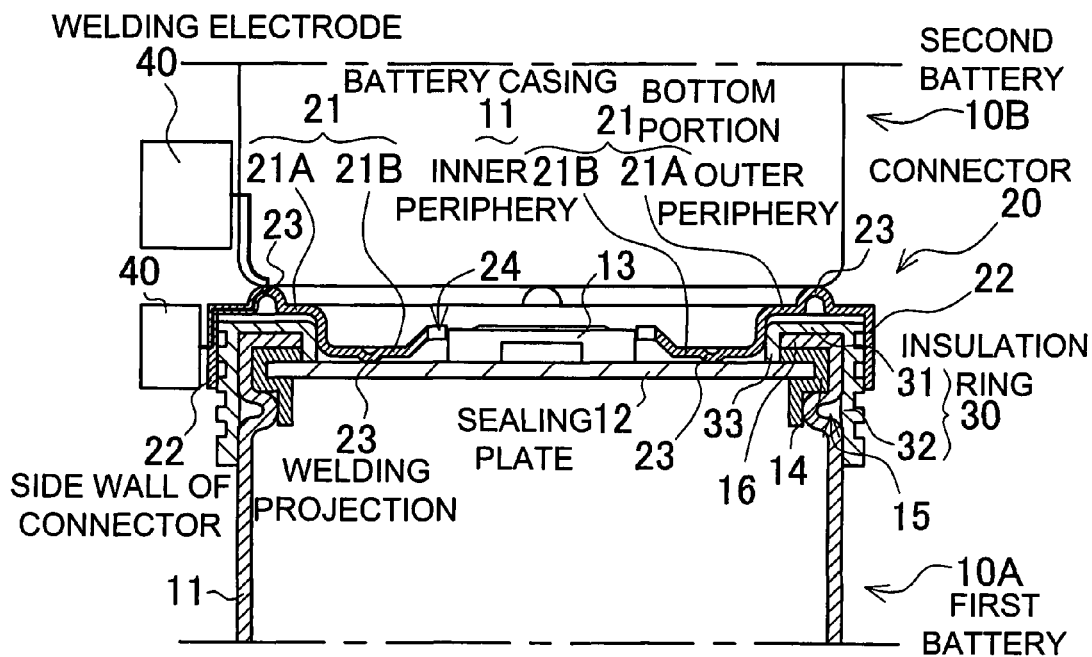
FIG. 14 is an enlarged cross-sectional view showing the coupling process in the battery pack shown in FIG. 9.

As shown in FIGS. 13 and 14, the above-described connector is so structured that the inner periphery 21B and the outer periphery 21A of the bottom portion 21 is spot-welded and coupled to the first battery 10A and the second battery 10B. In regard to the connector 20, after the inner periphery 21B is spot-welded to the sealing plate 12 of the first battery 10A, the outer periphery 21A is spot-welded to the bottom wall of the battery casing 11 of the second battery 10B.

FIG. 13 shows how the inner periphery 21B of the connector 20 is welded to the sealing plate 12 of the first battery 10A. The Figure illustrates that the inner periphery 21B of the connector 20 is welded to the first battery 10A in the following procedure.
(1) After the insulation ring 30 is attached to the first battery 10A, the connector 20 is placed on the sealing plate 12 of the first battery 10A.
(2) As indicated by arrow in the Figure, a pair of the welding electrodes 40 are shifted toward the connector 20 to allow the welding electrode 40 to press the inner periphery 21B of the connector 20. The welding electrode 40 is pressed upon the welding projection 23 provided adjacently to the inner periphery 21B.
(3) A welding current is allowed to flow to the welding electrode 40, so that the inner periphery 21B of the connector 20 is spot-welded to the sealing plate 12 of the first battery 10A. In this state, the two welding projections 23 adjacently disposed are welded to the sealing plate 12 of the first battery 10A.
(4) Subsequently, the welding electrode 40 is shifted to and pressed against the welding projection 23 which remains to be welded, and then a welding current is allowed to flow for welding the two yet-to-be-welded welding projections 23 to the sealing plate 12.

The outer periphery 21A of the connector 20 is welded to the battery casing 11 of the second battery 10B in the following steps, as shown in FIG. 14.
(1) The second battery 10B is placed upon the connector 20.
(2) A pair of welding electrodes 40 are laterally pressed against the battery casing 11 of the second battery 10B and against the side wall 22 of the connector 20 fixed to the first battery 10A. The welding electrode 40 is pressed against the battery casing 11 of the first battery 10A and against the side wall 22 of the connector 20, at the outside of the welding projection 23 provided to the outer periphery 21A.
(3) In this state, the welding current is allowed to flow to the welding electrode 40, and the welding projection 23 provided to the outer periphery 21A is welded to the bottom wall of the battery casing 11 of the second battery 10B. In this state, the welding current flows as indicated by a thick line in FIG. 14, and the welding projection 23 of the outer periphery 21A is welded to the battery casing 11 of the second battery 10B.
(4) The connector 20 is provided with four pieces of welding projections 23 at the outer periphery 21A. In order to weld each of the welding projections 23 to the battery casing 11 of the second battery 10B, the position of the welding electrode 40 is sequentially shifted to a position outside the welding projection 23, so that the four pieces of welding projections 23 are welded to the battery casing 11 of the second battery 10B.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims.

The present application is based on Application No. 2006-270192 filed in Japan on Sep. 30, 2006, the content of which is incorporated herein by reference.

What is claimed is:

1. A battery pack comprising:
a first battery and a second battery, each of which comprises a battery casing and a sealing plate that closes an aperture of the battery casing, the first battery and the second battery being placed in a linear relationship with each other; and
a connector made of a metallic plate, the connector being disposed between the first battery and the second battery so as to couple the first battery to the second battery via the connector, with the connector being welded to the sealing plate of the first battery and to the battery casing of the second battery, so that the adjoining first battery and second battery are linearly disposed to be connected in series;
wherein the connector, being made of the metallic plate, is in a form of a tube with a bottom, being composed of a bottom portion and a side wall;
wherein, in regard to the bottom portion of the connector, an outer periphery is welded to a bottom wall of the battery casing of the second battery, while an inner periphery at an interior side of the outer periphery is welded to the sealing plate of the first battery;
wherein the side wall of the connector, being protruded toward the first battery, has an inner diameter larger than an outer diameter at an end portion of the first battery, so that the first battery is inserted inside the side wall in a non-contact state; and
wherein the end portion of the first battery is inserted inside the side wall of the connector in a non-contact state, with the bottom portion being welded to the first battery and the second battery, so that the first battery is coupled to the second battery by the connector.

2. The battery pack as recited in claim 1, wherein the first battery has the sealing plate fixed to the aperture of the battery casing of the first battery by mechanically caulking a periphery of the aperture, and the first battery is also provided with a mechanically caulked ridge at a circumference of the sealing plate, and wherein the connector is provided with a recess at the bottom portion as the inner periphery, so that such recessed inner periphery is welded to the sealing plate of the first battery and the outer periphery is welded to the bottom wall of the battery casing of the second battery.

3. The battery pack as recited in claim 1, wherein the bottom portion of the connector, being larger than the outer diameter of the battery casing of the first battery, has the side wall coupled to the outer periphery of the bottom portion.

4. The battery pack as recited in claim 1, wherein an insulation ring is disposed between the outer periphery and side wall of the connector and the first battery, so that the insulation ring insulates the connector from the battery casing of the first battery.

5. The battery pack as recited in claim 4, wherein the first battery has a mechanically caulked ridge at a circumference of the sealing plate, with the insulation ring being disposed between the mechanically caulked ridge and the bottom portion of the connector.

6. The battery pack as recited in claim 5, wherein the insulation ring is coupled to an insulation plate, for insulating the bottom portion of the connector from the mechanically caulked ridge, the insulation ring being coupled to an outer side of the insulation plate so as to define an insulation tube for covering the outer side of the battery casing.

7. The battery pack as recited in claim 6, wherein the insulation plate, along the inner periphery, is integrally structured with a ring ridge for covering an inner face of the mechanically caulked ridge.

8. The battery pack as recited in claim 7, wherein the ring ridge is so configured as to be fitted inside the mechanically caulked ridge.

9. The battery pack as recited in claim 8, wherein the ring ridge is placed between the inner periphery of the connector and the mechanically caulked ridge, so that the bottom portion is insulated from the mechanically caulked ridge.

10. The battery pack as recited in claim 4, wherein that the insulation ring is provided, at the outer periphery thereof, with a fitting-in groove for allowing a lip of the side wall to be fitted in.

11. The battery pack as recited in claim 1, wherein the first battery has the mechanically caulked ridge at the circumference of the sealing plate, and the outer diameter of the inner periphery of the connector is smaller than the inner diameter of the mechanically caulked ridge of the first battery.

12. The battery pack as recited in claim 11, wherein the connector has a step between the outer periphery and the inner periphery, and the step is larger than an amount of protrusion of the mechanically caulked ridge.

13. The battery pack as recited in claim 1, wherein the connector is provided, at the inner periphery of the bottom portion, with a welding projection protruding toward the sealing plate of the first battery, and the outer periphery is provided with a welding projection protruding toward a bottom wall of the second battery.

14. The battery pack as recited in claim 13, wherein, in regard to the connector, the welding projections on the inner periphery and the welding projections on the outer periphery are disposed in the same radial direction.

15. The battery pack as recited in claim 1, wherein, in regard to the bottom portion of the connector, the inner periphery and the outer periphery are divided by a cutout into a plurality of regions.

16. A method for manufacturing the battery pack as recited in claim 1 comprising: a first battery, with an aperture of a battery case being closed with a sealing plate; a second battery placed in a linear relationship with the first battery; and a connector made of a metallic plate and disposed between the first battery and the second battery, wherein the connector is welded to the sealing plate of the first battery and to the battery casing of the second battery and wherein the adjoining first battery and second battery are linearly placed to be connected in series, the method comprising:
working the metallic plate in a form of a tube with a bottom, being composed of a bottom portion and a side wall;
providing the bottom portion with an inner periphery welded to the sealing plate of the first battery and also with an outer periphery welded to the bottom wall of the battery casing of the second battery;
forming the side wall in a shape which allows an end portion of the first battery to be inserted inside the side wall of the connector in a non-contact state, to thus make up the connector;
inserting the end portion of the first battery inside the side wall of the connector In a non-contact state;
welding the inner periphery provided at the bottom portion of the connector fixedly to the sealing plate of the first battery;

stacking the second battery on the connector so that the connector is interposed between the first battery and the second battery; and welding the outer periphery provided at the bottom portion of the connector to the bottom wall of the battery casing of the second battery, while a welding electrode is pressed against the wall of the battery casing of the second battery and against the side wall of the connector.

* * * * *